United States Patent
Eckhardt et al.

(10) Patent No.: US 7,576,750 B2
(45) Date of Patent: Aug. 18, 2009

(54) METHOD AND ARRANGEMENT FOR OPTIMIZING A LUMINANCE CHARACTERISTIC CURVE

(75) Inventors: Wolfgang Eckhardt, Karlsruhe (DE); Andreas Kaercher, Weingarten (DE); Uwe Nagel, Karlsruhe (DE); Hartmut Schulz, Rheinstetten (DE)

(73) Assignee: EIZO GmbH, Karlsruhe (DE)

( * ) Notice: Subject to any disclaimer, the term of this patent is extended or adjusted under 35 U.S.C. 154(b) by 877 days.

(21) Appl. No.: 10/922,976

(22) Filed: Aug. 23, 2004

(65) Prior Publication Data

US 2006/0038807 A1 Feb. 23, 2006

(30) Foreign Application Priority Data

Aug. 21, 2003 (DE) ................ 103 38 484

(51) Int. Cl.
*G09G 5/02* (2006.01)
(52) U.S. Cl. ............. 345/601; 345/589; 345/690; 382/167; 382/274
(58) Field of Classification Search ........... 345/600; 382/162
See application file for complete search history.

(56) References Cited

U.S. PATENT DOCUMENTS

2002/0131634 A1* 9/2002 Weibrecht et al. ........... 382/162
2004/0008208 A1* 1/2004 Dresevic et al. ............ 345/589

FOREIGN PATENT DOCUMENTS

| DE | 197 21 984 C2 | 12/1998 |
|---|---|---|
| WO | WO 03/026285 A2 | 3/2003 |
| WO | 2004/055769 A1 | 7/2004 |

* cited by examiner

*Primary Examiner*—Antonio A Caschera
(74) *Attorney, Agent, or Firm*—Sughrue Mion, PLLC

(57) ABSTRACT

A method and an arrangement for optimizing the luminance characteristic curve for a display system using a lookup table. Digitized video levels are supplied to this lookup table and are optimized using correction values stored in the lookup table. With suitable means, the luminance characteristic curve can be easily adapted to standards and/or custom specifications. The memory requirement is low, since it is not necessary to provide different lookup tables for different ambient luminosities or selected reproduction models (curves).

10 Claims, 4 Drawing Sheets

METHOD AND ARRANGEMENT FOR OPTIMIZING A LUMINANCE CHARACTERISTIC CURVE

The following disclosure is based on German Patent Application No. 103 38 484.7, filed on Aug. 21, 2003, which is incorporated into this application by reference in its entirety.

BACKGROUND OF THE INVENTION

The present invention relates to, among other things, a method and an arrangement for optimizing a luminance characteristic curve using a lookup table to which digitized video levels can be supplied using correction values that are stored in the lookup table.

Particularly for applications in the medical field, the requirements to be satisfied by an image reproduction system, such as the panel of a flat screen display, are quite high with respect to the image-reproduction characteristic of the system. The image reproduction characteristic indicates how an electrical video signal is converted into an optical signal consisting of luminance and chromaticity. It is desirable, for example, that the increase in luminance is perceptibly equidistant as a function of a video input signal (a video level). Perceptibly equidistant means, for example, that the human eye perceives an image at a video level of 50% of its maximum value, as being half as bright (or luminous) as an image at a video level of 100%. To achieve this goal of the increase in luminance being perceptibly equidistant as a function of a video input signal, mechanisms for adapting the luminance characteristic curve to the sensitivity of the human eye are required.

For instance, the luminance characteristic can be adapted using a so-called lookup table. In particular, using a lookup table, a correction is effected in that a graphics processor, which is provided to control a panel of a flat screen display, initially writes video input values and video output values, which are associated with these video input values, into a lookup table. The video output value that is subsequently transmitted to the panel is determined by these video input values, such that a luminance according to a desired luminance characteristic can be set.

Such a lookup table stores, for example, values based on the so-called DICOM Standard (Digital Imaging and Communications in Medicine, Part 14: Grayscale Standard Display Function). These DICOM-based values describe a curve that simulates the perception of the human eye. According to this DICOM Standard, for contrast levels that are still perceptible (just noticeable differences) in the region of 1024, a luminance range of 0.05 cd/m$^2$ to 4000 cd/m$^2$ is defined in a test image. If a panel is adjusted to this DICOM curve, this adjustment is valid only for a certain minimum and maximum luminance. These values, if optimal viewing conditions are to be maintained, depend on the ambient luminosity.

German Patent Specification DE 197 21 984 C2 discloses a monitor with a picture tube, a video amplifier and a focusing and deflecting unit to produce, focus, and deflect an electron beam of the picture tube. Furthermore, the monitor has a video memory and a lookup table circuit arrangement connected thereto, which is connected to a digital-to-analog converter, to which the video amplifier is connected. The lookup table is selected as a function of the ambient luminosity. In this conventional monitor, a plurality of lookup tables are stored in a memory and are used to correct the luminance characteristic as a function of a specific ambient luminosity. For this purpose, a specific lookup table is selected corresponding to a specific ambient luminosity and is then used to correct the image data. The drawback is that a large amount of memory is required to be able to provide different lookup tables for different ambient luminosities.

WO 03/026285 discloses a circuit arrangement for controlling a flat screen display whose image reproduction characteristic can be adapted as a function of the ambient light and a backlight.

OBJECTS OF THE INVENTION

An object of the present invention is to provide a method and an arrangement for optimizing a luminance characteristic curve with a lookup table such that the luminance characteristic can be easily adapted to standards and/or custom defaults and to changes in the ambient light.

SUMMARY OF THE INVENTION

This object, and others, are attained, for example, by a method for optimizing a luminance characteristic curve for a display system using a lookup table, to which digitized video levels are supplied, using correction values stored in the lookup table, comprising: determining natural response luminance characteristic data of a test image without the influence of ambient light during a presetting phase; storing said natural response luminance characteristic data; specifying a desired luminance characteristic during a selection phase; detecting a change in an illumination of the display system based on an actual ambient light during a normal operating mode; calculating correction values during this normal operating mode by taking into account the detected illumination, the desired luminance characteristic, and the natural response luminance characteristic data; and storing the correction values in the lookup table.

This object, and others, are also attained by an arrangement for optimizing a luminance characteristic curve for a display system with a lookup table, to which digitized video levels are supplied, using correction values stored in the lookup table, comprising: a first determining means which determines natural response luminance characteristic data of a test image without the influence of ambient light, during a presetting phase; a first storing means which stores the natural response luminance characteristic data in a first memory; a second storing means which stores luminance values of a desired luminance characteristic, during a selection phase, in a second memory; a detection means which detects a change in an illumination of the display system due to the current ambient light during a normal operating mode; a second determining means which determines correction values, by taking into account the detected illumination, the desired luminance characteristic, and the natural response luminance characteristic data; a third storing means which stores the correction values in the lookup table.

Additionally, this object and others may be attained by a method for adjusting a luminance characteristic curve for a display system comprising: storing desired luminance characteristic values corresponding to a desired luminance characteristic curve in a lookup table; storing natural response luminance values in said lookup table corresponding to a luminance response of said display system to test images without an influence of ambient light; detecting ambient light illumination of said display system during normal operation; adjusting a range of luminances output by said display system based on the detected ambient light illumination; scaling said stored natural response luminance values to correspond to said adjusted range of luminances output by said display system; storing video input levels corresponding to a video signal in said lookup table; calculating adjusted video output levels which correspond, respectively, to said video input levels; and supplying said adjusted video output levels to said display system; wherein said adjusted video output levels are calculated by a calculation procedure comprising: determining an adjusted luminance level of said display system for each video input level based on said stored desired luminance characteristic values; calculating a corresponding adjusted video output level necessary to achieve said desired luminance level based on said stored natural response luminance values.

Further, this object and others may be attained by an apparatus for adjusting a luminance characteristic curve for a display system comprising: a memory configured to store a lookup table; wherein said lookup table comprises desired luminance characteristic values corresponding to a desired luminance characteristic curve; wherein said lookup table further comprises natural response luminance values corresponding to a luminance response of said display system to test images without an influence of ambient light; a detector configured to detect ambient light illumination of said display system during normal operation; a controller configured to adjust a range of luminances output by said display system based on the detected ambient light illumination; a processor configured to scale said stored natural response luminance values to correspond to said adjusted range of luminances output by said display system; an input device configured to input a video signal; a video signal processor configured to store video input levels corresponding to said video signal in said lookup table; a calculator configured to calculate adjusted video output levels which correspond, respectively, to said video input levels; and an output device configured to output said adjusted video output levels to said display system; wherein said video output levels are calculated by a calculation procedure comprising: determining an adjusted luminance level of said display system for each video input level based on said stored desired luminance characteristic values; calculating a corresponding adjusted video output level necessary to achieve said adjusted luminance level based on said stored natural response luminance values.

It is advantageous if a user can locally select the luminance characteristic curve. In the selection phase, a curve can be selected, for example, based on one of the standards, DICOM, CIELAB, or LOG Luminance, or a user-specific curve can be selected. Moreover, the memory requirements are low for a method and arrangement consistent with the present invention, since it is not necessary to provide different lookup tables for different ambient luminosities or reproduction models (selected curves).

BRIEF DESCRIPTION OF THE DRAWINGS

The present invention, supplements, and further refinements will now be described in greater detail, by way of example, with reference to exemplary and non-limiting embodiments of the present invention depicted in the drawings, in which.

DETAILED DESCRIPTION

Figure 1:
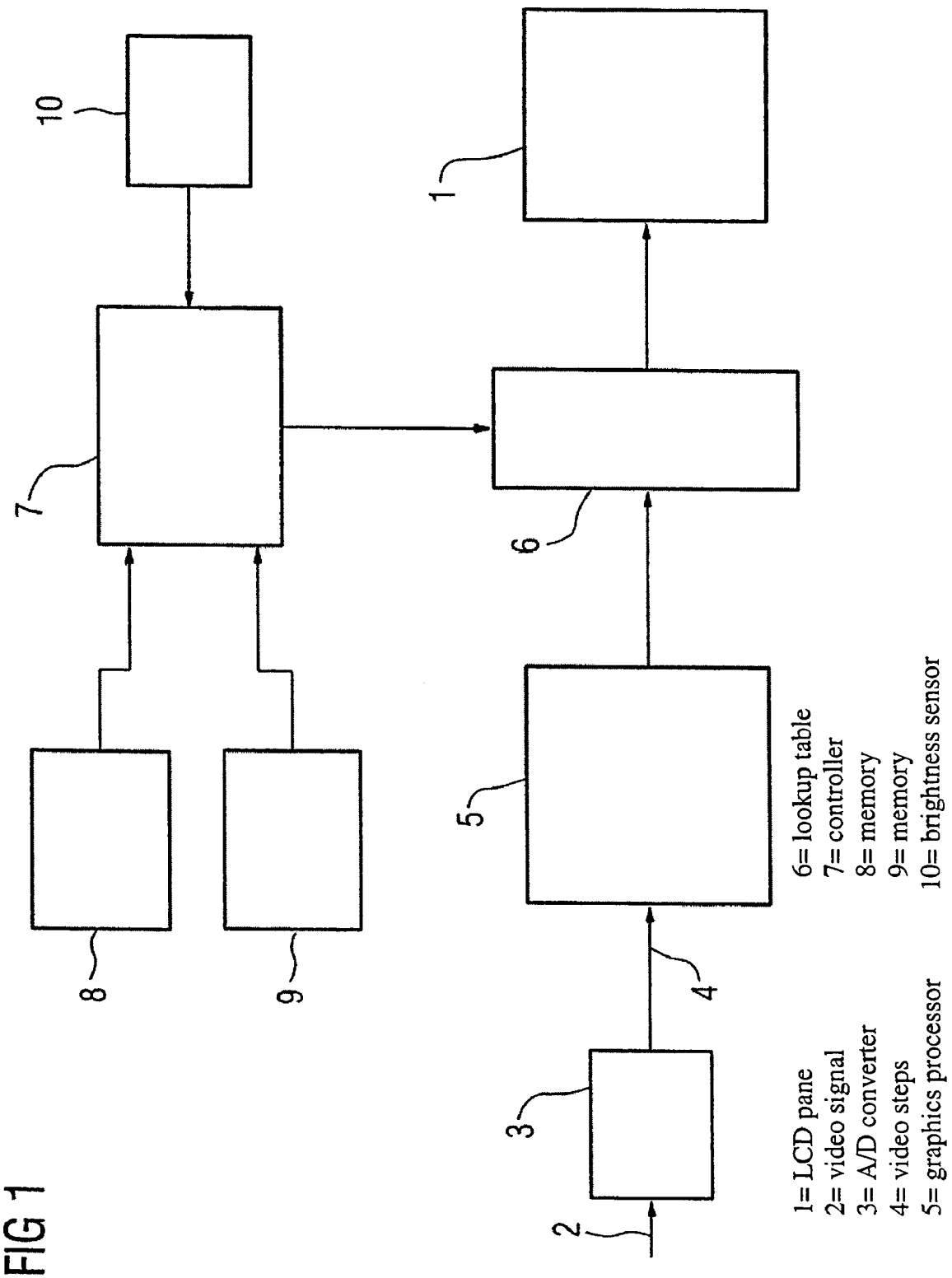
FIG. 1 shows a schematic representation of an arrangement with an image reproducing system.

In FIG. 1, 1 identifies a monochrome LCD panel of a flat screen display on which an image corresponding to a video signal 2 can be reproduced. For this purpose, an A/D converter 3 first digitizes the analog video signal 2. In the exemplary embodiment shown in FIG. 1, it is assumed that the A/D converter 3 generates 256 video steps 4 from a video level range between 0 volts and 0.7 volts. A video level of 0 volts (the smallest voltage) corresponds to a video step 0, and a video level of 0.7 volts (the largest voltage) corresponds to a video step 255. The video steps 4 are transmitted to a graphics processor 5, which processes the digitized image information such that, for example, the image information can also be displayed full-frame at image resolutions other than the resolution of the LCD panel 1. The graphics processor 5 can, of course, be configured to handle other tasks, e.g., overlaying a video image or overlaying an on-screen display ("OSD"). The graphics processor 5 transmits the video steps corresponding to the image information to a lookup table 6, which can be a component of the graphics processor 5, and which evaluates the video steps and sends the evaluated video steps to the LCD panel 1, which visually represents the evaluated video steps. The evaluation of the video steps by the lookup table 6, and thus an adaptation of the luminance characteristic to a desired luminance characteristic, is done in such a way that, for example, a video step transmitted by the graphics processor 5 is transformed into a video step that is associated therewith and which corresponds to a desired luminance. For instance, a video step 64 at the input of the lookup table 6 may be transformed into a video step 60 at the output of the lookup table 6, causing a luminance on the LCD panel 1 corresponding to this video step 60.

The video steps at the output of the lookup table 6, which are associated with the video steps at the input of the lookup table 6, and are provided for optimizing the luminance characteristic curve, can be stored in the lookup table 6 by a controller 7, which can be a component of the flat screen display or a personal computer. The controller 7 determines these optimizing video steps using the following data:

a) Using a desired luminance characteristic stored in a memory 8, e.g., a desired luminance characteristic based on a standard, for example, a DICOM or CIELAB standard, or a custom-tailored luminance characteristic. This desired luminance characteristic is specified in a selection phase. For example, the selection may be menu-driven with a selection mask displayed on a display unit of the personal computer. The personal computer may also transfer the luminance values and the associated video steps to the memory 8 via a suitable interface;

b) Using a "natural response" luminance characteristic of the LCD panel stored in a memory 9. This natural response characteristic is determined by first recording a luminance response to test images in the form of grayscale pictures. These grayscale pictures are successively generated with different video steps ranging from a video step 0 to a video step 255. For this purpose, the lookup table 6 is loaded with a linear ramp, such that the input video steps of the lookup table relate to the output video steps of this lookup table as follows:

| Video input value of the lookup table | Video output value of the lookup table |
| --- | --- |
| 0 | 0 |
| 1 | 4 |
| . | . |
| . | . |
| . | . |
| 63 | 252 |

-continued

| Video input value of the lookup table | Video output value of the lookup table |
|---|---|
| 64 | 256 |
| . | . |
| . | . |
| . | . |
| 127 | 508 |
| 128 | 512 |
| . | . |
| . | . |
| . | . |
| 255 | 1020 |

Figure 2:
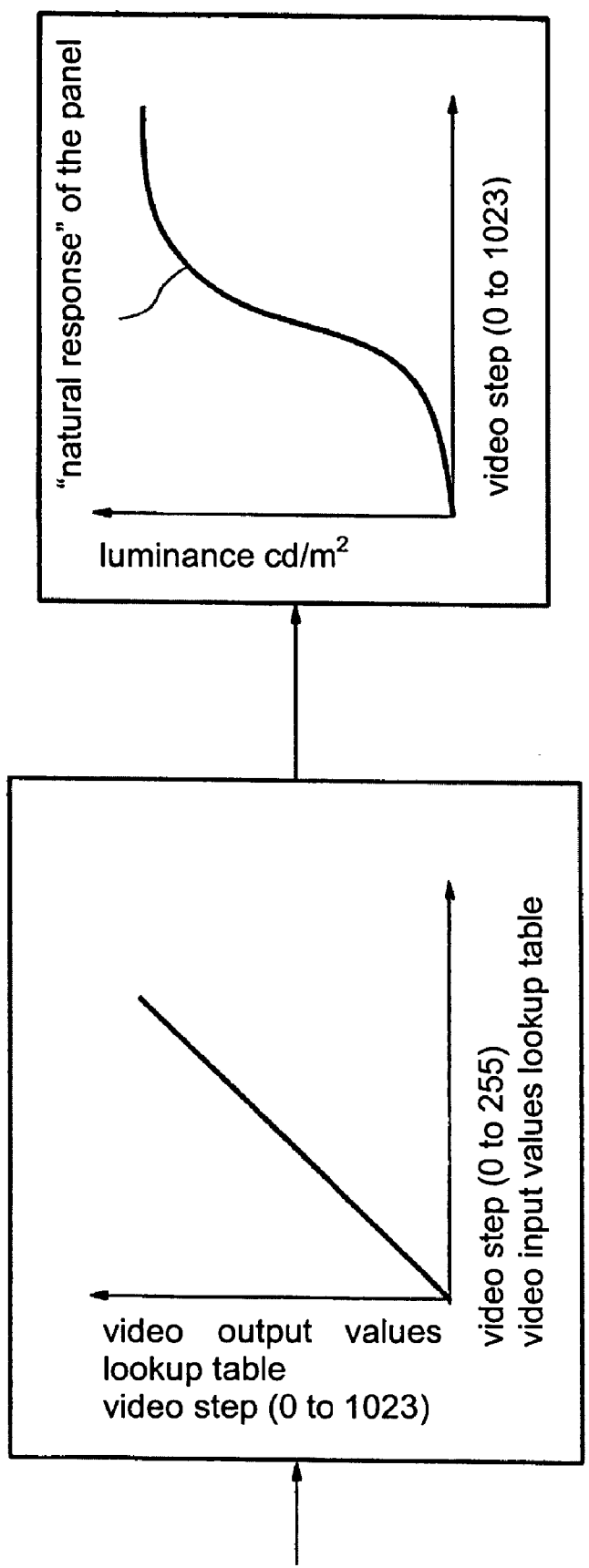
FIG. 2 shows a schematic representation of a "natural response" luminance characteristic.

The "natural response" data of the LCD panel stored in the memory 9 are acquired and recorded once at the factory, without the influence of ambient light, using a suitable measuring head, e.g., during the factory setting. These data are transferred to the memory 9, e.g., by a personal computer via a suitable interface. Based on this linear ramp, a luminance characteristic of the LCD panel depicted in FIG. 2 results;

c) Using the change in luminance during a normal operating mode, e.g., during use of the system in a medical setting, such that the ambient light illumination is determined by a brightness sensor 10.

Figure 3:
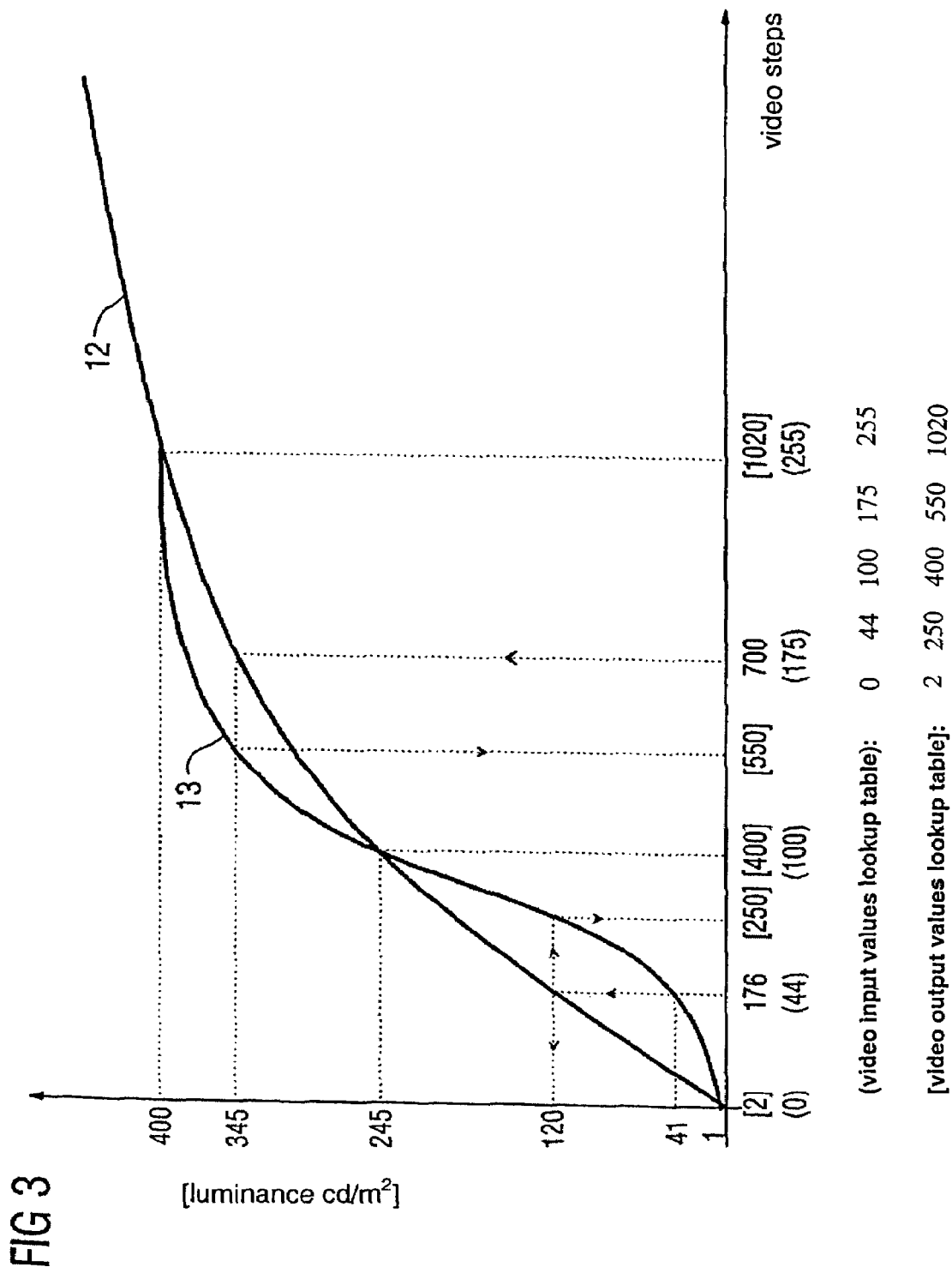
FIGS. 3 and 4 show luminance characteristics for differing types of ambient light.

To explain the method for optimizing a luminance characteristic curve, reference is now made to FIG. 3, in which luminance characteristics are depicted, by way of example, as a function of the video steps.

Consistent with an exemplary and non-limiting embodiment of the present invention, as shown in FIG. 3, it is assumed that a user selects a desired luminance characteristic 12 in accordance with the DICOM standard, and that a "natural response" luminance characteristic of an LCD panel proceeds in accordance with a curve 13. It is further assumed, as shown in FIG. 3, that for a given ambient light the LCD panel is adjusted according to a desired curve 12 within a range of 1 cd/m$^2$ to 400 cd/m$^2$. This means that for these desired luminances ranging from 1 cd/m$^2$ to 400 cd/m$^2$, video output steps ranging from 0 to 1023 (1020) are determined for video input values ranging between 0 and 255 according to the "natural response" curve 13. For example, the video input value 44, which gives a luminance value of 41 cd/m$^2$ according to the curve 13, is transformed into the video output value 250 to obtain a luminance value of 120 cd/m$^2$ for this video input value 44 according to the desired DICOM luminance curve 12. Correspondingly, as shown in FIG. 3, the video input value 175 is transformed into a video output value 550 to obtain a luminance value of 345 cd/m$^2$ according to the desired luminance curve 12.

Figure 4:
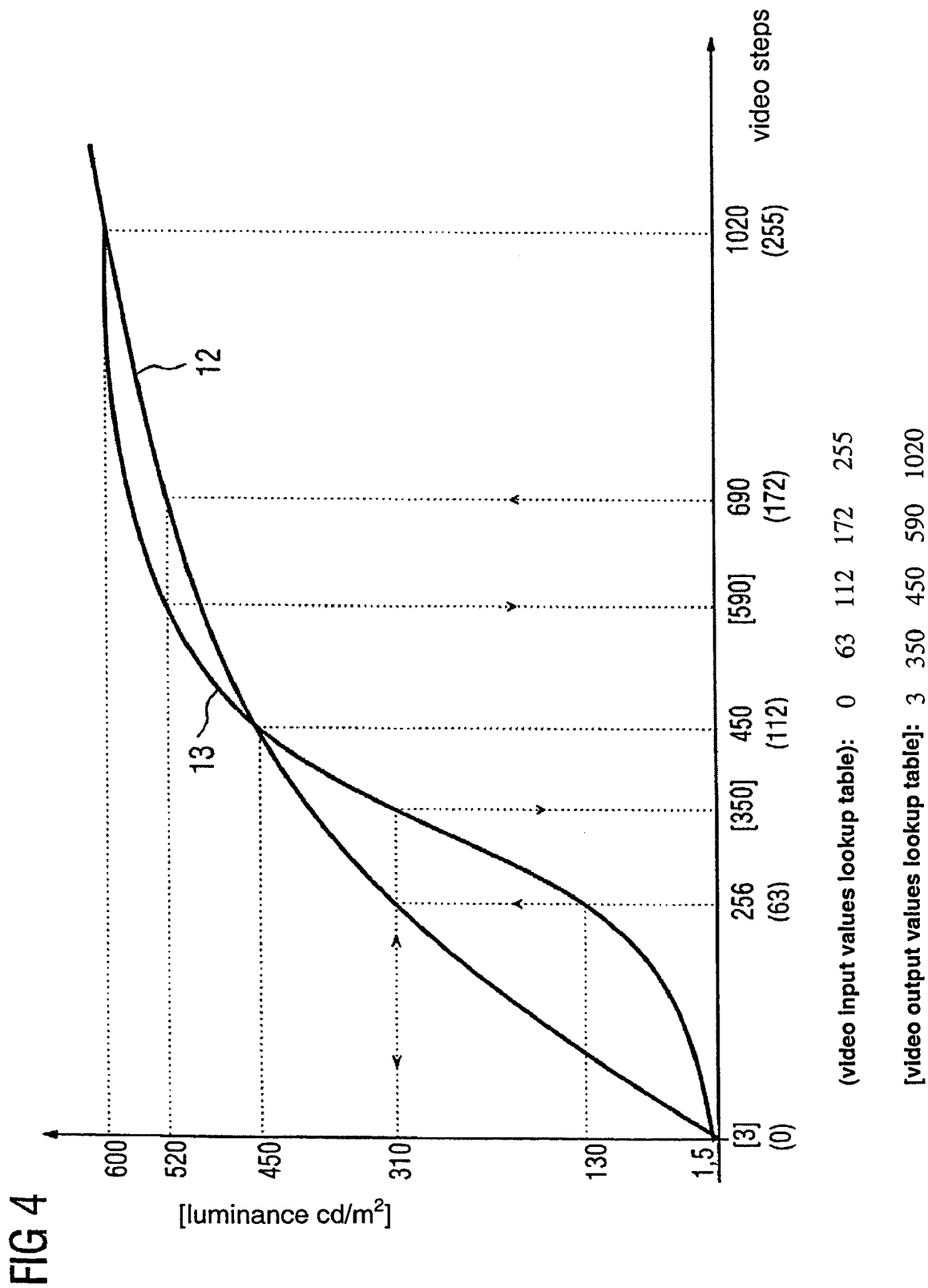

Consistent with another exemplary and non-limiting embodiment of the present invention, as shown in FIG. 4, it is now assumed that, based on a change in the ambient light, the video output values of the lookup table must be adjusted to ensure the desired luminance characteristic according to the DICOM standard. From the illumination detected by the brightness sensor 10 and an empirically determined quantity, which indicates the luminance that is to be generated at a given illumination, a change in luminance is determined. In the example shown in FIG. 4, it is assumed that, based on a change in the illumination, desired luminances of 1.5 cd/m$^2$ to 600 cd/m$^2$ should result. To reproduce the luminances in this range of 1.5 cd/m$^2$ to 600 cd/m$^2$, the "natural response" data are scaled to the new maximum luminance 600 cd/m$^2$. In the exemplary embodiment shown in FIG. 4 this means that, based on the maximum luminance of 400 cd/m$^2$ before the change in the ambient light, the scaling factor equals 1.5. By way of illustration, for a video input value 63, a video output value 350 results, such that a desired luminance 310 cd/m$^2$ in accordance with the DICOM standard is obtained instead of the luminance value of 130 cd/m$^2$. Similarly, as shown in FIG. 4, the video input value 172 is transformed into a video output value 590 to obtain a luminance value of 520 cd/m$^2$ in accordance with the desired luminance curve 12.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for adjusting a luminance characteristic curve for a display system comprising:
    storing desired luminance characteristic values corresponding to a desired luminance characteristic curve in a lookup table;
    storing natural response luminance values in said lookup table corresponding to a luminance response of said display system to test images without an influence of ambient light;
    detecting ambient light illumination of said display system during normal operation with a brightness sensor;
    adjusting a range of luminances output by said display system based on the detected ambient light illumination;
    scaling said stored natural response luminance values to correspond to said adjusted range of luminances output by said display system;
    storing video input levels corresponding to a video signal in said lookup table;
    calculating adjusted video output levels which correspond, respectively, to said video input levels; and
    supplying said adjusted video output levels to said display system;
    wherein said adjusted video output levels are calculated by a calculation procedure comprising:
        determining an adjusted luminance level of said display system for each video input level based on said stored desired luminance characteristic values; and
        calculating a corresponding adjusted video output level necessary to achieve said adjusted luminance level based on said stored natural response luminance values.

2. The method according to claim 1, wherein the desired luminance characteristic curve is based on at least one of the DICOM, CIELAB, or LOG Luminance standards.

3. The method according to claim 1, wherein the desired luminance characteristic curve is a custom-tailored luminance characteristic curve.

4. The method according to claim 1, wherein the desired luminance characteristic curve is selected by a menu-driven selection method with a selection mask displayed on a display unit.

5. An apparatus for adjusting a luminance characteristic curve for a display system comprising:
    a memory configured to store a lookup table;
    wherein said lookup table comprises desired luminance characteristic values corresponding to a desired luminance characteristic curve; and wherein said lookup table further comprises natural response luminance values corresponding to a luminance response of said display system to test images without an influence of ambient light;
a detector configured to detect ambient light illumination of said display system during normal operation;
a controller configured to adjust a range of luminances output by said display system based on the detected ambient light illumination;
a processor configured to scale said stored natural response luminance values to correspond to said adjusted range of luminances output by said display system;
an input device configured to input a video signal;
a video signal processor configured to store video input levels corresponding to said video signal in said lookup table;
a calculator configured to calculate adjusted video output levels which correspond, respectively, to said video input levels; and
an output device configured to output said adjusted video output levels to said display system;
wherein said video output levels are calculated by a calculation procedure comprising:
determining an adjusted luminance level of said display system for each video input level based on said stored desired luminance characteristic values;
calculating a corresponding adjusted video output level necessary to achieve said adjusted luminance level based on said stored natural response luminance values.

6. The apparatus according to claim 5, wherein the desired luminance characteristic values are based on at least one of the DICOM, CIELAB, or LOG Luminance standards.

7. The apparatus according to claim 5, wherein the desired luminance characteristic values are based on a custom-tailored luminance characteristic curve.

8. The apparatus according to claim 5, wherein the desired luminance characteristic values are selected by a menu-driven selection method with a selection mask displayed on a display unit.

9. The apparatus according to claim 5, wherein said lookup table is a component of a graphics processor.

10. The apparatus according to claim 5, wherein said display system is a component of a medical device.

* * * * *